US010311300B2

(12) United States Patent
Teverovskiy

(10) Patent No.: US 10,311,300 B2
(45) Date of Patent: Jun. 4, 2019

(54) IRIS RECOGNITION SYSTEMS AND METHODS OF USING A STATISTICAL MODEL OF AN IRIS FOR AUTHENTICATION

(71) Applicant: EyeLock LLC, New York, NY (US)

(72) Inventor: Mikhail Teverovskiy, White Plains, NY (US)

(73) Assignee: Eyelock LLC, New York, NY (US)

( * ) Notice: Subject to any disclaimer, the term of this patent is extended or adjusted under 35 U.S.C. 154(b) by 191 days.

(21) Appl. No.: 15/597,927

(22) Filed: May 17, 2017

(65) Prior Publication Data

US 2017/0337424 A1 Nov. 23, 2017

Related U.S. Application Data

(60) Provisional application No. 62/337,965, filed on May 18, 2016.

(51) Int. Cl.
*G06K 9/00* (2006.01)
*G06K 9/40* (2006.01)
(Continued)

(52) U.S. Cl.
CPC ......... *G06K 9/00617* (2013.01); *G06F 21/32* (2013.01); *G06K 9/0051* (2013.01);
(Continued)

(58) Field of Classification Search
None
See application file for complete search history.

(56) References Cited

U.S. PATENT DOCUMENTS 4,641,349 A 2/1987 Flom et al.
5,259,040 A 11/1993 Hanna
(Continued)

FOREIGN PATENT DOCUMENTS

WO WO-2010/062371 6/2010
WO WO-2011/093538 8/2011
WO WO-2016/010720 A1 1/2016

OTHER PUBLICATIONS

Viriri, Serestina, and Jules-R. Tapamo. "Efficient iris pattern recognition based on cumulative-sums and majority vote methods." In Proceedings of the 20th annual symposium of pattern recognition association of South Africa (PRASA), pp. 117-120. 2009. (Year: 2009).*

(Continued)

*Primary Examiner* — Edward Park
*Assistant Examiner* — Nathan J Bloom
(74) *Attorney, Agent, or Firm* — Foley & Lardner LLP

(57) ABSTRACT

The present disclosure describes systems and methods of using iris data for authentication. A biometric encoder may translate an image of the iris into a rectangular representation of the iris. The rectangular representation may include a plurality of rows corresponding to a plurality of annular portions of the iris. The biometric encoder may extract an intensity profile from at least one of the plurality of rows, the intensity profile modeled as a stochastic process. The biometric encoder may obtain a stationary stochastic component of the intensity profile by removing a non-stationary stochastic component from the intensity profile. The biometric encoder may remove at least a noise component from the stationary component using auto-regressive based modeling, to produce at least a non-linear background signal, and may combine the non-stationary component and the at least (Continued)

the non-linear background signal, to produce a biometric template for authenticating the person.

20 Claims, 10 Drawing Sheets

(51) Int. Cl.

| | |
|---|---|
| ***G06K 9/46*** | (2006.01) |
| ***G06T 3/00*** | (2006.01) |
| ***G06F 21/32*** | (2013.01) |

(52) U.S. Cl.

CPC ....... *G06K 9/0061* (2013.01); *G06K 9/00926* (2013.01); *G06K 9/40* (2013.01); *G06K 9/46* (2013.01); *G06T 3/0012* (2013.01); *G06F 2221/2117* (2013.01); *G06T 2207/30041* (2013.01)

(56) References Cited

U.S. PATENT DOCUMENTS

| | | | |
|---|---|---|---|
| 5,291,560 | A | 3/1994 | Daugman |
| 5,488,675 | A | 1/1996 | Hanna |
| 5,572,596 | A | 11/1996 | Wildes et al. |
| 5,581,629 | A | 12/1996 | Hanna et al. |
| 5,613,012 | A | 3/1997 | Hoffman et al. |
| 5,615,277 | A | 3/1997 | Hoffman |
| 5,737,439 | A | 4/1998 | Lapsley et al. |
| 5,764,789 | A | 6/1998 | Pare et al. |
| 5,802,199 | A | 9/1998 | Pare et al. |
| 5,805,719 | A | 9/1998 | Pare et al. |
| 5,838,812 | A | 11/1998 | Pare et al. |
| 5,901,238 | A | 5/1999 | Matsushita |
| 5,953,440 | A | 9/1999 | Zhang et al. |
| 5,978,494 | A | 11/1999 | Zhang |
| 6,021,210 | A | 2/2000 | Camus et al. |
| 6,028,949 | A | 2/2000 | McKendall |
| 6,064,752 | A | 5/2000 | Rozmus et al. |
| 6,069,967 | A | 5/2000 | Rozmus et al. |
| 6,144,754 | A | 11/2000 | Okano et al. |
| 6,192,142 | B1 | 2/2001 | Pare et al. |
| 6,247,813 | B1 | 6/2001 | Kim et al. |
| 6,252,977 | B1 | 6/2001 | Salganicoff et al. |
| 6,289,113 | B1 | 9/2001 | McHugh et al. |
| 6,366,682 | B1 | 4/2002 | Hoffman et al. |
| 6,373,968 | B2 | 4/2002 | Okano et al. |
| 6,377,699 | B1 | 4/2002 | Musgrave et al. |
| 6,424,727 | B1 | 7/2002 | Musgrave et al. |
| 6,483,930 | B1 | 11/2002 | Musgrave et al. |
| 6,532,298 | B1 | 3/2003 | Cambier et al. |
| 6,542,624 | B1 | 4/2003 | Oda |
| 6,546,121 | B1 | 4/2003 | Oda |
| 6,594,376 | B2 | 7/2003 | Hoffman et al. |
| 6,594,377 | B1 | 7/2003 | Kim et al. |
| 6,652,099 | B2 | 11/2003 | Chae et al. |
| 6,700,998 | B1 | 3/2004 | Murata |
| 6,714,665 | B1 | 3/2004 | Hanna et al. |
| 6,760,467 | B1 | 7/2004 | Min et al. |
| 6,850,631 | B1 | 2/2005 | Oda et al. |
| 6,917,695 | B2 | 7/2005 | Teng et al. |
| 6,980,670 | B1 | 12/2005 | Hoffman et al. |
| 6,985,608 | B2 | 1/2006 | Hoffman et al. |
| 7,095,901 | B2 | 8/2006 | Lee et al. |
| 7,146,027 | B2 | 12/2006 | Kim et al. |
| 7,248,719 | B2 | 7/2007 | Hoffman et al. |
| 7,271,939 | B2 | 9/2007 | Kono |
| 7,385,626 | B2 | 6/2008 | Aggarwal et al. |
| 7,414,737 | B2 | 8/2008 | Cottard et al. |
| 7,418,115 | B2 | 8/2008 | Northcott et al. |
| 7,428,320 | B2 | 9/2008 | Northcott et al. |
| 7,542,590 | B1 | 6/2009 | Robinson et al. |
| 7,558,406 | B1 | 7/2009 | Robinson et al. |
| 7,558,407 | B2 | 7/2009 | Hoffman et al. |
| 7,574,021 | B2 | 8/2009 | Matey |
| 7,583,822 | B2 | 9/2009 | Guillemot et al. |
| 7,606,401 | B2 | 10/2009 | Hoffman et al. |
| 7,616,788 | B2 | 11/2009 | Hsieh et al. |
| 7,639,840 | B2 | 12/2009 | Hanna et al. |
| 7,693,307 | B2 | 4/2010 | Rieul et al. |
| 7,697,786 | B2 | 4/2010 | Camus et al. |
| 7,715,595 | B2 | 5/2010 | Kim et al. |
| 7,719,566 | B2 | 5/2010 | Guichard |
| 7,797,606 | B2 | 9/2010 | Chabanne |
| 7,869,627 | B2 | 1/2011 | Northcott et al. |
| 7,929,732 | B2 | 4/2011 | Bringer et al. |
| 7,978,883 | B2 | 7/2011 | Rouh et al. |
| 8,009,876 | B2 | 8/2011 | Kim et al. |
| 8,025,399 | B2 | 9/2011 | Northcott et al. |
| 8,092,021 | B1 | 1/2012 | Northcott et al. |
| 8,132,912 | B1 | 3/2012 | Northcott et al. |
| 8,170,295 | B2 | 5/2012 | Fujii et al. |
| 8,233,680 | B2 | 7/2012 | Bringer et al. |
| 8,243,133 | B1 | 8/2012 | Northcott et al. |
| 8,279,042 | B2 | 10/2012 | Beenau et al. |
| 8,317,325 | B2 | 11/2012 | Raguin et al. |
| 9,483,696 | B2 * | 11/2016 | Connell, II ........ G06K 9/00617 |
| 2005/0084137 | A1 | 4/2005 | Kim et al. |
| 2006/0074986 | A1 | 4/2006 | Mallalieu et al. |
| 2007/0211922 | A1 | 9/2007 | Crowley et al. |
| 2007/0211924 | A1 * | 9/2007 | Hamza ................. G06K 9/0061 382/117 |
| 2008/0253622 | A1 | 10/2008 | Tosa et al. |
| 2009/0074256 | A1 | 3/2009 | Haddad |
| 2009/0097715 | A1 | 4/2009 | Cottard et al. |
| 2009/0161925 | A1 | 6/2009 | Cottard et al. |
| 2009/0220126 | A1 * | 9/2009 | Claret-Tournier ... G06K 9/0061 382/117 |
| 2009/0231096 | A1 | 9/2009 | Bringer et al. |
| 2010/0021016 | A1 | 1/2010 | Cottard et al. |
| 2010/0074477 | A1 | 3/2010 | Fujii et al. |
| 2010/0127826 | A1 | 5/2010 | Saliba et al. |
| 2010/0246903 | A1 | 9/2010 | Cottard |
| 2010/0278394 | A1 | 11/2010 | Raguin et al. |
| 2010/0310070 | A1 | 12/2010 | Bringer et al. |
| 2011/0007949 | A1 | 1/2011 | Hanna et al. |
| 2011/0158486 | A1 | 6/2011 | Bringer et al. |
| 2011/0194738 | A1 | 8/2011 | Choi et al. |
| 2011/0277518 | A1 | 11/2011 | Lais et al. |
| 2012/0020534 | A1 | 1/2012 | Hamza |
| 2012/0240223 | A1 | 9/2012 | Tu |
| 2012/0257797 | A1 | 10/2012 | Leyvand et al. |
| 2014/0064575 | A1 * | 3/2014 | Flom .................. G06K 9/00617 382/116 |
| 2015/0098630 | A1 | 4/2015 | Perna et al. |
| 2016/0012218 | A1 * | 1/2016 | Perna ................... G06K 9/0061 726/18 |
| 2017/0160813 | A1 * | 6/2017 | Divakaran .............. G06F 3/017 |

OTHER PUBLICATIONS

Roy, Kaushik, and Prabir Bhattacharya. “Optimal features subset selection and classification for iris recognition.” EURASIP Journal on Image and Video Processing 2008.1 (2008): 743103. (Year: 2008).*

Sharma, Lokesh, Gautam Thakur, and Ravinder Thakur. “An overview and examination of iris recognition Algorithms.” International Journal of Advance Research in Computer Science and Management Studies 2.8 (2014): 152-160. (Year: 2014).*

Ali, Musab Am. Biometric identification and recognition for iris using failure rejection rate (FRR). Diss. Ph. D. dissertation, Faculty Elect. Eng., Univ. Teknologi MARA, Shah Alam, Shah Alam, Jan 2016. (Year: 2016).*

B. Galvin, et al., Recovering Motion Fields: An Evaluation of Eight Optical Flow Algorithms, Proc. of the British Machine Vision Conf. (1998).

D. J. Thomson, “Spectrum Estimation and Harmonic Analysis,” Proceedings of the IEEE, vol. 70, No. 9, pp. 1055-1096, Sep. 1982.

J. Daugman, “High confidence visual recognition of persons by a test of statistical independence,” IEEE Transactions on Pattern Analysis and Machine Intelligence, vol. 15 , No. 11, pp. 1148-1161, 1993.

(56) References Cited

OTHER PUBLICATIONS

J. R. Bergen, et al., Hierarchical Model-Based Motion Estimation, European Conf. on Computer Vision (1993).
K. Nishino, et al., The World in an Eye, IEEE Conf. on Pattern Recognition, vol. 1, at pp. 444-451 (Jun. 2004).
R. Kumar, et al., Direct recovery of shape from multiple views: a parallax based approach, 12th IAPR Int'l Conf. on Pattern Recognition (1994).
Written Opinion and International Search Report on PCT/US2017/033076 dated Jul. 24, 2017.

* cited by examiner

IRIS RECOGNITION SYSTEMS AND METHODS OF USING A STATISTICAL MODEL OF AN IRIS FOR AUTHENTICATION

RELATED APPLICATIONS

This application claims the benefit and priority of U.S. provisional application No. 62/337,965, entitled "METHODS AND SYSTEMS BASED ON AN IRIS STOCHASTIC TEXTURE MODEL", and filed on May 18, 2016, the entirety of which is incorporated by reference for all purposes.

FIELD OF THE DISCLOSURE

This disclosure generally relates to systems and methods for using iris data, including but not limited to systems and methods of using an iris stochastic model for processing iris data and/or authentication.

BACKGROUND OF THE DISCLOSURE

Iris recognition is one of the most accurate and widely popular methods in biometric authentication. It is a contactless method that uses digital images of the detail-rich iris texture to create a genuine discrete biometric signature for the authentication. The images may be acquired by near infrared (NIR) light illumination of human eyes. Conventional iris recognition technology is largely based on iris image processing, feature extraction, encoding and matching techniques that were pioneered by John Daugman. However, much of the conventional techniques may not result in compact processing and/or storage of iris data, and moreover, does not leverage on other aspects of iris data to improve encoding.

BRIEF SUMMARY OF THE DISCLOSURE

Described herein are systems and methods for implementing and using an iris stochastic model for processing iris data and/or authentication. Certain aspects of the present systems and methods may involve establishing an iris data model that systematically identifies components unique to a person and components that are not, for instance, a component arising from noise or environmental factors such as illumination. Some aspects of the present systems and methods may be deployed for acquisition of iris data, e.g., to generate an iris template that is compact and efficient for transmission, storage, retrieval and/or biometric matching. Certain aspects of the present systems and methods may be used for configuring, tuning and/or optimizing an iris acquisition and/or encoding process. For instance, by modeling certain portions of acquired iris data as a stochastic process, noise characteristics may be determined and removed from a biometric template.

In one aspect, this disclosure is directed to a method of using iris data for authentication. A sensor may acquire an image of an iris of a person. A biometric encoder may translate the image of the iris into a rectangular representation of the iris. The rectangular representation may include a plurality of rows corresponding to a plurality of circular circumferences within the iris. The biometric encoder may extract an intensity profile from at least one of the plurality of rows. The biometric encoder may determine a non-stationary component of the intensity profile. The biometric encoder may obtain a stationary component of the intensity profile by removing the non-stationary component from the intensity profile. The stationary component may be modeled as a stochastic process. The biometric encoder may remove at least a noise component from the stationary component using auto-regressive (AR) based modeling of the noise component, to produce at least a non-linear background signal. The biometric encoder may combine the non-stationary component and the at least the non-linear background signal, to produce a biometric template for authenticating the person.

In some embodiments, the biometric encoder identifies one or more periodic waveforms in the stationary component. The biometric encoder may remove the identified one or more periodic waveforms from the stationary stochastic component to produce the at least the non-linear background signal. The biometric encoder may remove the identified one or more periodic waveforms from the stationary stochastic component to produce a background component, and may determine a width of an autocorrelation function of the background component. The biometric encoder may set a filter size of a first filter according to the determined width, for filtering or processing periodic waveforms identified from another iris image. The biometric encoder may determine a texture noise threshold using the background component.

In certain embodiments, biometric encoder may store (e.g., in a memory device) a representation of the identified one or more periodic waveforms for authenticating the person. A biometric recognition or matching device may compare the biometric template with stored data to authenticate the person. In some embodiments, the stationary stochastic component comprises a signal that fluctuates around zero intensity. In certain embodiments, the intensity profile is modeled as a one-dimensional stochastic process with the stationary and non-stationary stochastic components.

In another aspect, this disclosure is directed to a system of using iris data for authentication. The system may include a sensor to acquire an image of an iris of a person. The system may include a biometric encoder to translate the image of the iris into a rectangular representation of the iris. The rectangular representation may include a plurality of rows corresponding to a plurality of circular circumferences within the iris. The biometric encoder may extract an intensity profile from at least one of the plurality of rows. The biometric encoder may determine a non-stationary component of the intensity profile. The biometric encoder may obtain a stationary component of the intensity profile by removing the non-stationary stochastic component from the intensity profile. The stationary component may be modeled as a stochastic process. The biometric encoder may remove at least a noise component from the stationary component using auto-regressive (AR) based modeling of the noise component, to produce at least a non-linear background signal. The biometric encoder may combine the non-stationary component and the at least the non-linear background signal, to produce a biometric template for authenticating the person.

In certain embodiments, the biometric encoder may identify one or more periodic waveforms in the stationary component. The biometric encoder may remove the identified one or more periodic waveforms from the stationary stochastic component to produce the at least the non-linear background signal. The biometric encoder may remove the identified one or more periodic waveforms from the stationary stochastic component to produce a background component, and determine a width of an autocorrelation function of the background component. The biometric encoder may set a filter size of a first filter according to the determined width, for filtering or processing periodic waveforms identified from another iris image. The biometric encoder may determine a texture noise threshold using the background component.

In some embodiments, the biometric encoder stores a representation of the identified one or more periodic waveforms for authenticating the person. The system may include one or more processors to compare the biometric template with stored data to authenticate the person. In some embodiments, the stationary stochastic component includes a signal that fluctuates around zero intensity. In certain embodiments, the intensity profile is modeled as a one-dimensional stochastic process with the stationary and non-stationary stochastic components.

The details of various embodiments of the invention are set forth in the accompanying drawings and the description below.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

Figure 1A:
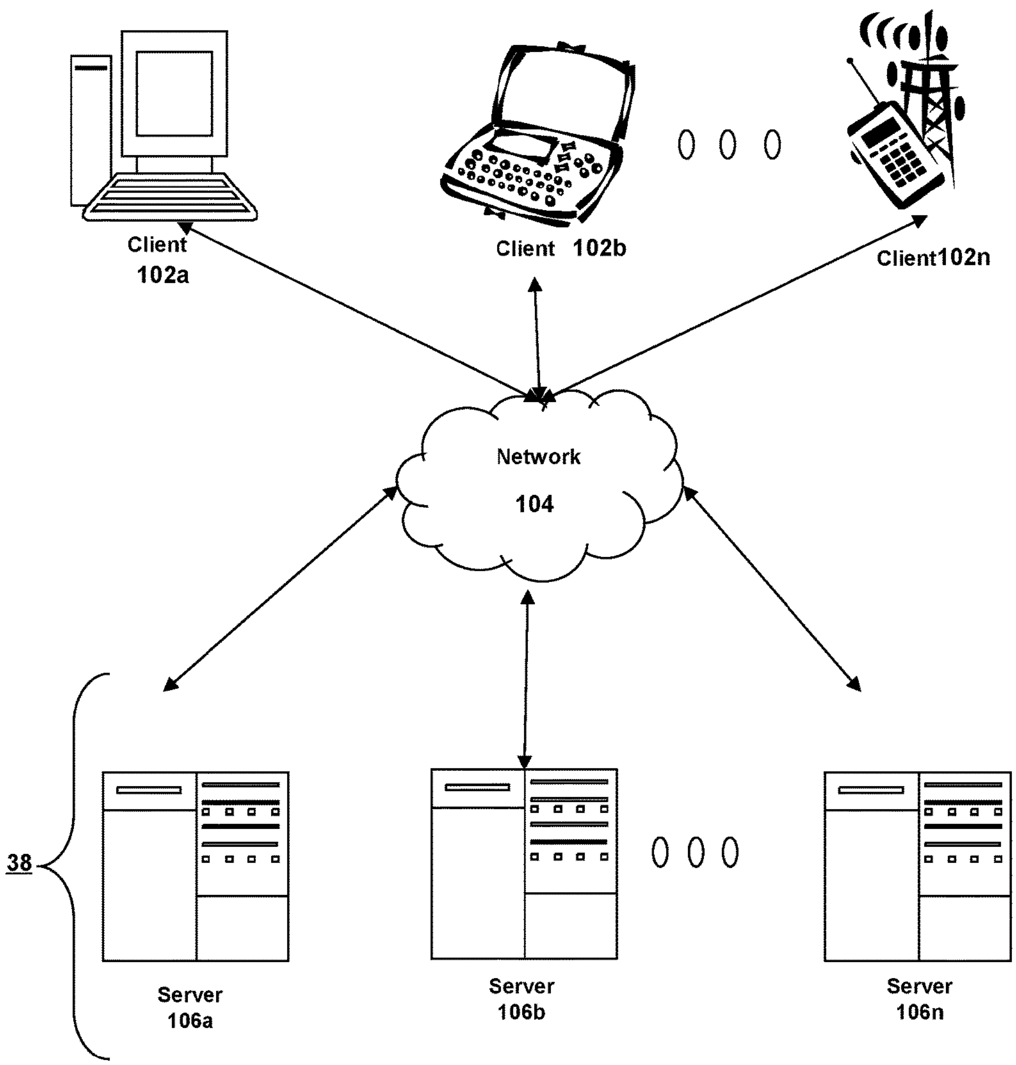
FIG. 1A is a block diagram depicting an embodiment of a network environment comprising client machines in communication with remote machines.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein; and Section B describes embodiments of systems and methods of establishing and using an iris stochastic model.

A. Computing and Network Environment

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 101*a*-101*n* (also generally referred to as local machine(s) 101, client(s) 101, client node(s) 101, client machine(s) 101, client computer(s) 101, client device(s) 101, endpoint(s) 101, or endpoint node(s) 101) in communication with one or more servers 106*a*-106*n* (also generally referred to as server(s) 106, node 106, or remote machine(s) 106) via one or more networks 104. In some embodiments, a client 101 has the capacity to function as both a client node seeking access to resources provided by a server and as a server providing access to hosted resources for other clients 101*a*-101*n*.

Although FIG. 1A shows a network 104 between the clients 101 and the servers 106, the clients 101 and the servers 106 may be on the same network 104. The network 104 can be a local-area network (LAN), such as a company Intranet, a metropolitan area network (MAN), or a wide area network (WAN), such as the Internet or the World Wide Web. In some embodiments, there are multiple networks 104 between the clients 101 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be any type and/or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol(s) or standard(s) used to communicate among mobile devices, including AMPS, TDMA, CDMA, GSM, GPRS, UMTS, WiMAX, 3G or 4G. In some embodiments, different types of data may be transmitted via different protocols. In other embodiments, the same types of data may be transmitted via different protocols.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS, manufactured by Microsoft Corp. of Redmond, Wash.), while one or more of the other servers 106 can operate on according to another type of operating system platform (e.g., Unix or Linux).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the Xen hypervisor, an open source product whose development is overseen by Citrix Systems, Inc.; the Virtual Server or virtual PC hypervisors provided by Microsoft or others.

In order to manage a machine farm 38, at least one aspect of the performance of servers 106 in the machine farm 38 should be monitored. Typically, the load placed on each server 106 or the status of sessions running on each server 106 is monitored. In some embodiments, a centralized service may provide management for machine farm 38. The centralized service may gather and store information about a plurality of servers 106, respond to requests for access to resources hosted by servers 106, and enable the establishment of connections between client machines 101 and servers 106.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

In one embodiment, the server 106 provides the functionality of a web server. In another embodiment, the server **106*a* receives requests from the client 101, forwards the requests to a second server 106*b* and responds to the request by the client 101 with a response to the request from the server 106*b*. In still another embodiment, the server 106 acquires an enumeration of applications available to the client 101 and address information associated with a server 106' hosting an application identified by the enumeration of applications. In yet another embodiment, the server 106 presents the response to the request to the client 101 using a web interface. In one embodiment, the client 101 communicates directly with the server 106 to access the identified application. In another embodiment, the client 101 receives output data, such as display data, generated by an execution of the identified application on the server 106**.

Figure 1B:
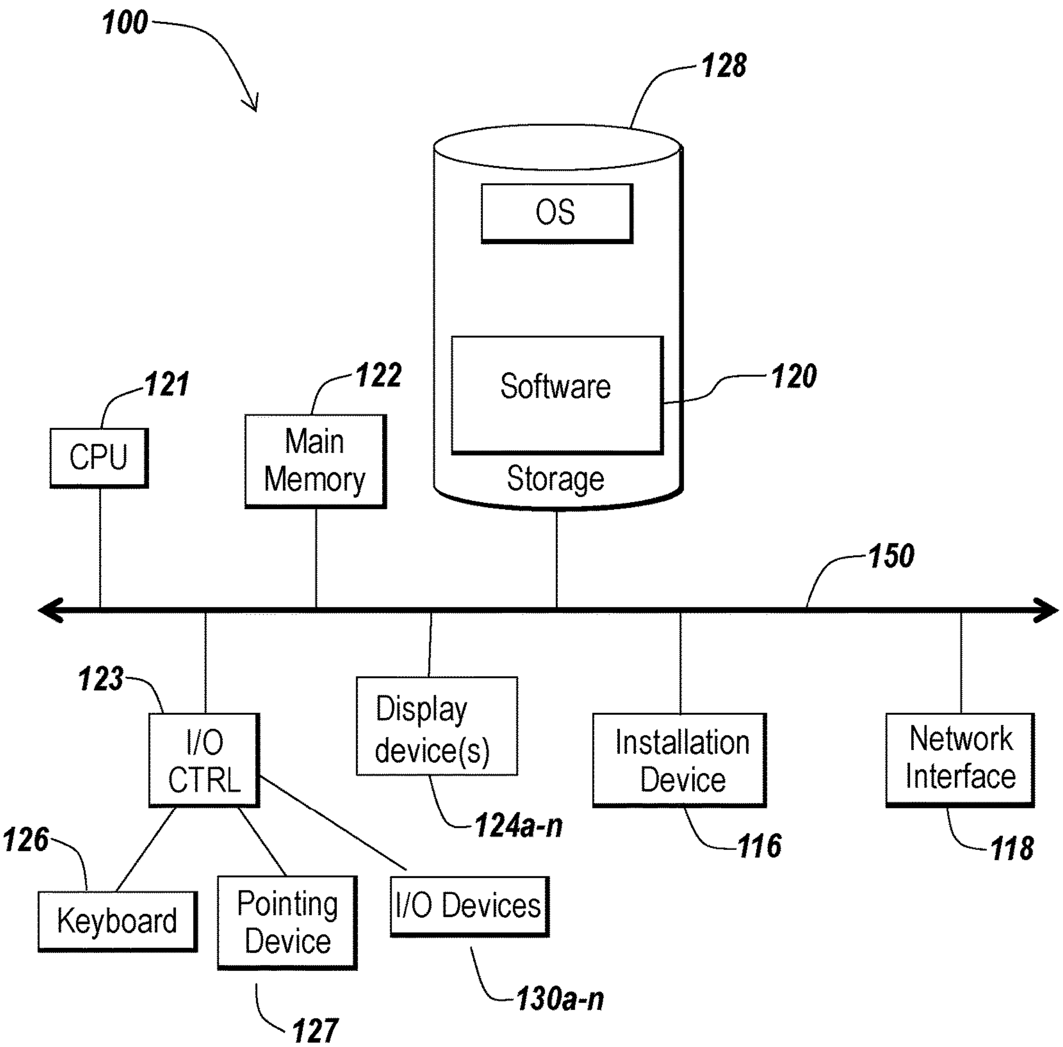
FIGS. 1B and 1C are block diagrams depicting embodiments of computing devices useful in connection with the methods and systems described herein.
Figure 1C:
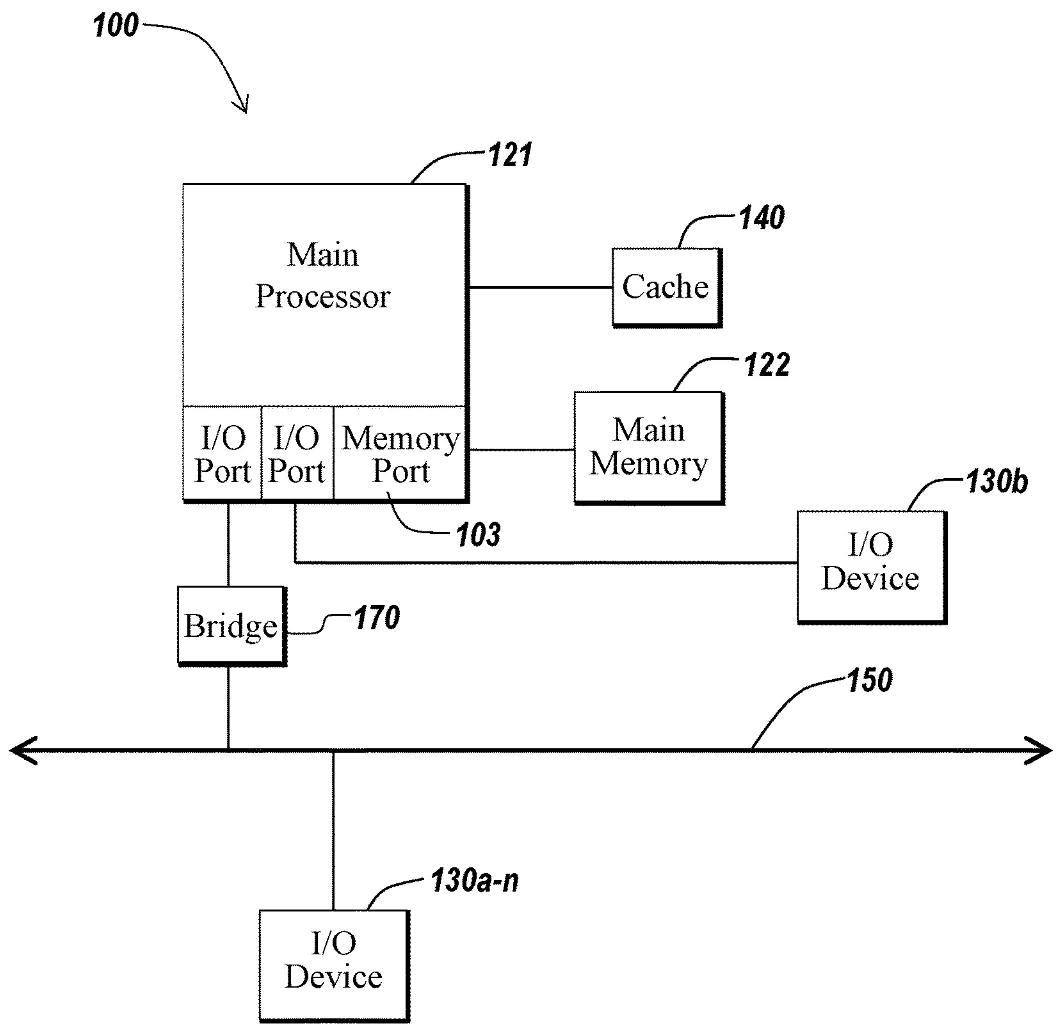

The client 101 and server 106 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of the client 101 or a server 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices **124*a*-101*n*, a keyboard 126 and a pointing device 127, such as a mouse. The storage device 128 may include, without limitation, an operating system and/or software. As shown in FIG. 1C, each computing device 100 may also include additional optional elements, such as a memory port 103, a bridge 170, one or more input/output devices 130*a*-130*n* (generally referred to using reference numeral 130), and a cache memory 140 in communication with the central processing unit 121**.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), NAND Flash, NOR Flash and Solid State Drives (SSD). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 may communicate directly with I/O device 130*b*, for example via HYPERTRANSPORT, RAPIDIO, or INFINIBAND communications technology. FIG. 1C also depicts an embodiment in which local busses and direct communication are mixed: the processor 121 communicates with I/O device 130*a* using a local interconnect bus while communicating with I/O device 130*b* directly.

A wide variety of I/O devices 130*a*-130*n* may be present in the computing device 100. Input devices include keyboards, mice, trackpads, trackballs, microphones, dials, touch pads, and drawing tablets. Output devices include video displays, speakers, inkjet printers, laser printers, projectors and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc. of Los Alamitos, Calif.

Referring again to FIG. 1B, the computing device 100 may support any suitable installation device 116, such as a disk drive, a CD-ROM drive, a CD-R/RW drive, a DVD-ROM drive, a flash memory drive, tape drives of various formats, USB device, hard-drive or any other device suitable for installing software and programs. The computing device 100 can further include a storage device, such as one or more hard disk drives or redundant arrays of independent disks, for storing an operating system and other related software, and for storing application software programs such as any program or software 120 for implementing (e.g., configured and/or designed for) the systems and methods described herein. Optionally, any of the installation devices 116 could also be used as the storage device. Additionally, the operating system and the software can be run from a bootable medium, for example, a bootable CD.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124*a*-124*n*, which each may be of the same or different type and/or form. As such, any of the I/O devices 130*a*-130*n* and/or the I/O controller 123 may comprise any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect or otherwise use the display devices 124*a*-124*n*. In one embodiment, a video adapter may comprise multiple connectors to interface to multiple display devices 124*a*-124*n*. In other embodiments, the computing device 100 may include multiple video adapters, with each video adapter connected to one or more of the display devices 124*a*-124*n*. In some embodiments, any portion of the operating system of the computing device 100 may be configured for using multiple displays 124*a*-124*n*. In other embodiments, one or more of the display devices 124*a*-124*n* may be provided by one or more other computing devices, such as computing devices 100*a* and 100*b* connected to the computing device 100, for example, via a network. These embodiments may include any type of software designed and constructed to use another computer's display device as a second display device 124*a* for the computing device 100. One ordinarily skilled in the art will recognize and appreciate the various ways and embodiments that a computing device 100 may be configured to have multiple display devices 124*a*-124*n*.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, manufactured by Google Inc; WINDOWS 7 and 8, manufactured by Microsoft Corporation of Redmond, Wash.; MAC OS, manufactured by Apple Computer of Cupertino, Calif.; WebOS, manufactured by Research In Motion (RIM); OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPAD or IPOD family of devices manufactured by Apple Computer of Cupertino, Calif., a device of the PLAYSTATION family of devices manufactured by the Sony Corporation of Tokyo, Japan, a device of the NINTENDO/Wii family of devices manufactured by Nintendo Co., Ltd., of Kyoto, Japan, or an XBOX device manufactured by the Microsoft Corporation of Redmond, Wash.

In some embodiments, the computing device 100 may have different processors, operating systems, and input devices consistent with the device. For example, in one embodiment, the computing device 100 is a smart phone, mobile device, tablet or personal digital assistant. In still other embodiments, the computing device 100 is an Android-based mobile device, an iPhone smart phone manufactured by Apple Computer of Cupertino, Calif., or a Blackberry handheld or smart phone, such as the devices manufactured by Research In Motion Limited. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a tablet such as the Apple IPAD, or a digital audio player such as the Apple IPOD lines of devices, manufactured by Apple Computer of Cupertino, Calif. In another of these embodiments, the digital audio player may function as both a portable media player and as a mass storage device. In other embodiments, the computing device 100 is a digital audio player such as an MP3 player. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the communications device 101 includes a combination of devices, such as a mobile phone combined with a digital audio player or portable media player. In one of these embodiments, the communications device 101 is a smartphone, for example, an iPhone manufactured by Apple Computer, or a Blackberry device, manufactured by Research In Motion Limited. In yet another embodiment, the communications device 101 is a laptop or desktop computer equipped with a web browser and a microphone and speaker system, such as a telephony headset. In these embodiments, the communications devices 101 are web-enabled and can receive and initiate phone calls.

B. Iris Stochastic Model

Described herein are systems and methods for an iris stochastic texture model, including systems and methods for implementing and/or using an iris stochastic model for processing iris data and/or authentication. Certain aspects of the present systems and methods may be directed to establishing an iris data model that systematically identifies components unique to a person and components that are not, e.g., components arising from noise or environmental factors such as ambient light and/or illumination. Some aspects of the present systems and methods may be deployed for acquisition of iris data, e.g., to generate an iris template that is compact and efficient for transmission, storage, retrieval and/or biometric matching. Certain aspects of the present systems and methods may be used for configuring, tuning and/or optimizing an iris acquisition and/or encoding process. For instance, by modeling certain portions of acquired iris data as a stochastic process, noise characteristics may be determined, and filtering parameters may be established to configure the iris encoding process.

Figure 2A:
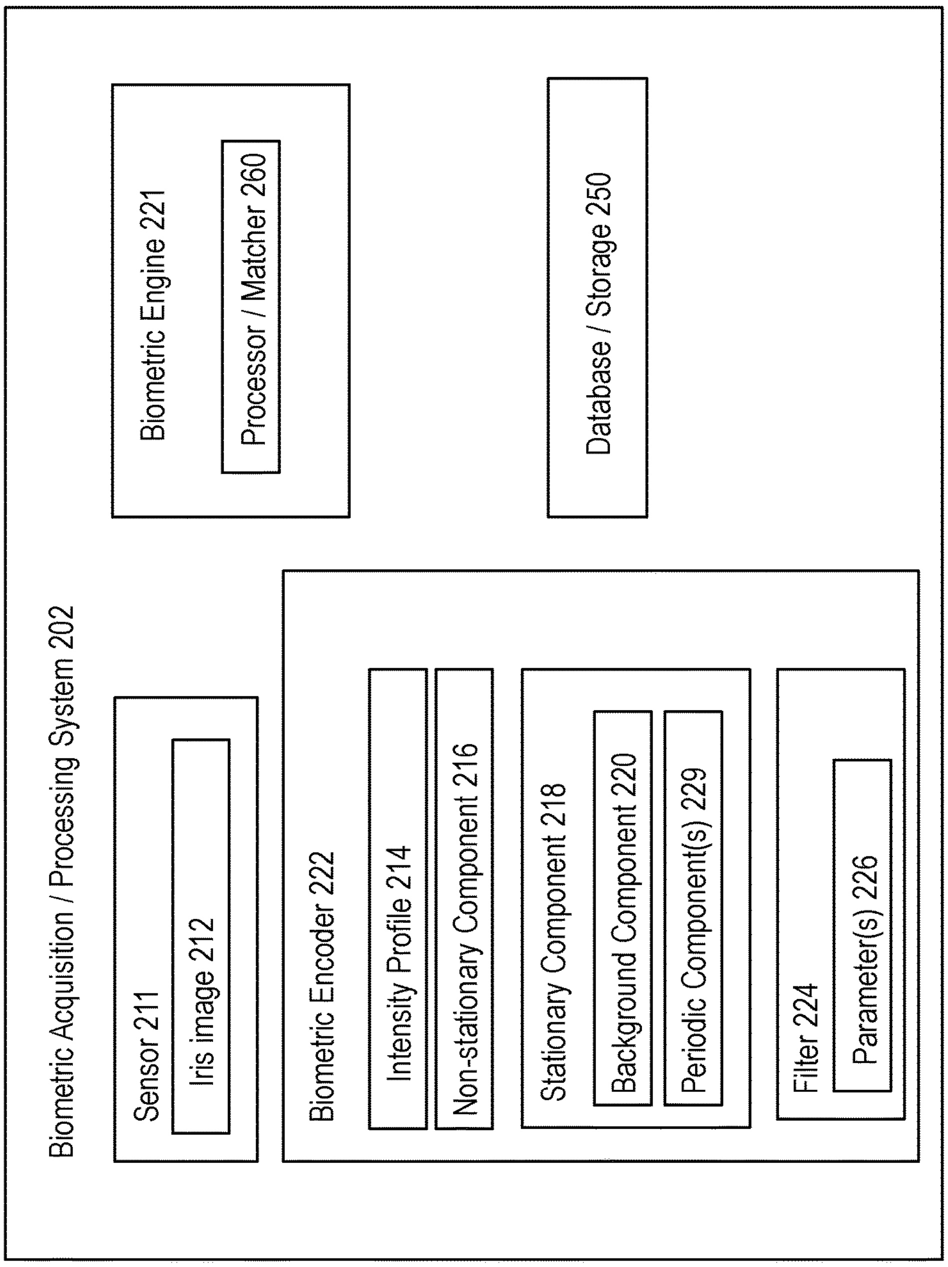
FIG. 2A is a block diagram depicting one embodiment of a system for using iris data for authentication.

Referring to FIG. 2A, one embodiment of a system involving an iris stochastic model is depicted. In brief overview, the system may include one or more subsystems or modules, for example, one or more sensors 211 and a biometric encoder 222, in a biometric acquisition or processing system 202 for instance. The biometric acquisition or processing system 202 may include or communicate with a database or storage device 250, and/or a biometric engine 221. For instance, the biometric acquisition or processing system 202 may transmit a biometric template generated from an acquired iris image, to the database 250 for storage. The database 250 may incorporate one or more features of any embodiment of memory/storage elements 122, 140, as discussed above in connection with at least FIGS. 1B-1C. In some embodiments, the biometric acquisition or processing system 202 and/or the database 250 may provide a biometric template to a biometric engine 221 for biometric matching against one or more other biometric template. In certain embodiments, the biometric acquisition or processing system 202 does not include the database 250 and/or the biometric engine 221, but may be in communication with one or both of these.

In some embodiments, the biometric acquisition or processing system 202 includes the database 250. The database may include or store biometric information, e.g., enrolled via the biometric encoder 222 and/or another device. The database may include or store information pertaining to a user, such as that of a transaction (e.g., a date, time, value of transaction, type of transaction, frequency of transaction, associated product or service), online activity (e.g., web page information, advertising presented, date, time, etc.), an identifier (e.g., name, account number, contact information), a location (e.g., geographical locations, IP addresses). The server may use the information in the database to verify, cross-check or correlate between network traffic or activities purportedly of the same user.

Each of the elements, modules and/or submodules in the system 202 is implemented in hardware, or a combination of hardware and software. For instance, each of these elements, modules and/or submodules can optionally or potentially include one or more applications, programs, libraries, scripts, tasks, services, processes or any type and form of executable instructions executing on hardware of the client 102 and/or server 106 for example. The hardware may include one or more of circuitry and/or a processor, for example, as described above in connection with at least 1B and 1C. Each of the subsystems or modules may be controlled by, or incorporate a computing device, for example as described above in connection with FIGS. 1A-1C.

A sensor 211 may be configured to acquire iris biometrics or data, such as in the form of one or more iris images 212. The system may include one or more illumination sources to provide light (near infra-red or otherwise) for illuminating an iris for image acquisition. The sensor may comprise one or more sensor elements, and may be coupled with one or more filters (e.g., an IR-pass filter) to facilitate image acquisition. The sensor 221 may be configured to focus on an iris and capture an iris image of suitable quality for performing iris recognition.

In some embodiments, an image processor of the system may operate with the sensor 221 to locate and/or zoom in on an iris of an individual for image acquisition. In certain embodiments, an image processor may receive an iris image 212 from the sensor 211, and may perform one or more processing steps on the iris image 212. For instance, the image processor may identify a region (e.g., an annular region) on the iris image 212 occupied by the iris. The image processor may identify an outer edge or boundary, and/or an inner edge or boundary of the iris on the iris image, using any type of technique (e.g., edge and/or intensity detection, Hough transform, etc.). The image processor may segment the iris portion according to the inner (pupil) and outer (limbus) boundaries of the iris on an acquired image. In some embodiments, the image processor may detect and/or exclude some or all non-iris objects, such as eyelids, eyelashes and specular reflections that, if present, can occlude some portion of iris texture. The image processor may isolate and/or extract the iris portion from the iris image 212 for further processing. The image processor may extract and/or provide a segmented iris annulus region for further processing.

In certain embodiments, a biometric encoder 222 of the system is configured to perform encoding on the iris portion of the iris image 212. The biometric encoder 222 and/or the image processor may translate, map, transform and/or unwrap a segmented iris annulus into a rectangular representation, e.g., using a homogeneous rubber-sheet model and/or dimensionless polar coordinates (radius and angle) with respect to a corresponding center (e.g., a corresponding pupil's center). In some embodiments, the size of the rectangle and partitioning of the polar coordinate system are predetermined or fixed. This procedure is sometimes referred to as iris normalization, and can compensate for pupil dilations and/or constrictions, for instance due to a corresponding iris reacting to an incident light. The biometric encoder 222 and/or the image processor may map or translate the iris portion of the iris image 212 from Cartesian coordinates to a rectangle in the polar coordinates (polar rectangle).

The polar rectangle, or rectangular form of the iris data, is sometimes referred to as a normal or normalized iris image or representation, or a normalized texture intensity field, or a variant thereof. Because annular and normalized iris images can be obtained from each other by an almost reversible (e.g., excluding small interpolation errors) transformation, the two forms of iris images can bear or hold pretty much the same amount of information. Thus, by way of illustration and/or for simplicity, portions of this disclosure may refer to a normalized iris image simply as an iris image or iris data.

In some embodiments, aspects of the image processor may be incorporated into the biometric encoder 222. Accordingly, the biometric encoder 222 may be referenced in this disclosure for performing one or more types of iris data processing only by way of illustration and/or simplification, and not intended to be limiting in any way. For instance, the biometric encoder 222 may include one or more components (e.g., feature extraction engine, intensity profile generator) for performing different types of iris data processing.

In some embodiments, the biometric encoder 222 performs feature extraction on the rectangular form of the iris data. The rectangular form of the iris data may comprise one or more rows and one or more columns of pixels, points and/or data. Feature extraction may refer to running a two dimensional (2D) digital filter on a normal iris image over a selected set of rows. A filter response of the digital filter at a point can depend on an image area the digital filter covers, which may be controlled by a filter size or scale parameter 226. Such filter responses may be computed at sampled row points. A filter size is sometimes referred to as a filter scale.

The biometric encoder 222 may be configured to generate an iris code using the filter response from the iris data (e.g., normal iris image). An iris code may be generated using one or more row intensity profiles, for instance. An iris code may be in any form, and may for example comprise a binary sequence of a constant length (e.g. equal to 2048 bits). Each code bit may be computed by evaluating the sign of the response, at one filter size of analysis for example. A code bit may be set to 1 if the response is positive, and zero otherwise. When a code bit is set, its validity may be assessed based on a corresponding response magnitude. For instance, if the response magnitude is above a predefined threshold, the bit may be classified as valid; otherwise it may be determined to be invalid. When performing a step of authentication (e.g., using the biometric engine 221), an iris code sequence may be compared or matched against a code which is stored in a database (e.g., database 250). The latter code, sometimes referred as a template, may be obtained during an enrollment process. A template is often associated with a known and/or authorized person's identity.

A biometric engine 221 may perform the matching process or biometric verification. The matching process may include calculating a ratio of number of bit disagreements between valid bits of the obtained iris sequence and a template to the total number of common valid bits in both the obtained iris sequence and the template (so called relative Hamming distance). The matching between the iris sequence and the template is considered successful if the relative Hamming distance value is below a predefined threshold. Otherwise the matching may be rejected as unsuccessful. If matching is successful the current iris sequence is said to be consistent with a stored template which leads to the conclusion that according to the threshold, both the current iris sequence and the template belong to the same individual.

In some embodiments, the biometric encoder 222 may utilize 2D complex-valued Gabor filters to compute an iris code, or use 2D real-valued Haar-like filters for example. The biometric encoder may employ, use or execute an iris encoding algorithm that is based on the normalized texture intensity field, which is a remapped (or otherwise, undisturbed) copy of the original iris image. The iris image 212 may be a biometric system's centerpiece in controlling quality or accuracy for iris recognition. Light intensities acquired in an iris image 212 are a result of light interactions (e.g., reflection and absorption) with an inner surface of the iris. These light intensities may be collected by lenses and registered by the imaging sensor 211. Shortcomings and deficiencies in image acquisition hardware (e.g., illuminators, lenses, sensors, etc.), conditions of the environment (e.g., ambient light, weather, indoor or outdoor conditions), human-device interactions (e.g., head tilt, pose, distance from the camera, eye blinking), personal features (e.g., certain eye color) and/or eyewear (e.g., glasses, lenses, eye color) can reduce the quality of captured iris images, may negatively impact the corresponding iris code and, therefore, can negatively impact a biometric system's identification performance.

With regards to iris image quality, main factors may include imaging noise, blurriness and presence of the non-iris objects. The last two can usually be detected and measured at the entry image quality check stage, and the segmentation stage, respectively. An excessive amount of blurriness and presence of non-iris structure(s) detected in an input image may prompt the system 202 to remove the image from further processing. On the other hand, imaging noise may be harder to detect and, hence, measure. Noise can increase the relative quantity of invalid matching bits in an iris code sequence.

In some embodiments, "noise vs. signal" threshold may be an important system parameter that can directly affect performance. In practice, system designers often use ad-hoc rules in order to determine a noise level of a particular filter response. Such rules can specify one or more thresholds for example, and can be used to identify noisy or invalid bits in the iris code sequence. For example, certain methods or experiments may show that a threshold corresponding to a heuristic "20%-80%" noise vs. signal split on the filter response histogram can deliver a stable performance on a set of iris images. According to such an example rule for identifying image noise, filter responses with magnitude below the $20^{th}$ percentile may be considered to be due to image noise. To derive "noise vs. signal" intensity threshold values based on this rule, filter responses at each of the considered filter sizes are collected from a set of iris images. For example, and in one or more embodiments, thresholds can be computed as values corresponding to the $20^{th}$ percentiles of the data histograms created for each considered filter size. A filter size may be defined as a length (e.g. in pixels) of a spatial segment that is used to calculate a digital filter's response at a given point (pixel). Such an approach may be referred to as threshold-based detection or estimation of noise. Accurate image noise estimation is a complex task that may require right assumptions on the nature of the noise, and/or mathematical methods for parameter estimation (which is often resource expensive).

In accordance with inventive concepts disclosed herein, embodiments of the present systems and methods can be used to determine key iris encoding parameters 226 such as texture noise threshold and/or filter scale. Accurate estimation of these parameters 226 can facilitate creation of a reliable and stable iris code sequence. The present systems and methods may leverage on aspects of a stochastic process to model iris texture. Iris texture has a structural signature for each person which serves as a unique biometric identifier. In order to make this structural signature available for biometric identification, the corresponding iris may be imaged by the sensor 211. Each image 212 may correspond to an instant snapshot of the iris texture structure at the time of acquisition. Corresponding intensity profiles 214 (e.g., established according to horizontal rows of the normalized iris data) from different images belonging to the same subject can appear alike but differ in small random fluctuations or microscale details.

Pixel intensities of an iris texture (also referred to as an iris texture intensity field) can be described as a family of random values such that their instant realizations (e.g., observed intensities) constitute a particular image. In accordance with this interpretation in view of the inventive concepts disclosed herein, an iris texture intensity field can be modelled as a realization of a 2D real-valued discrete stochastic process that is indexed by pixel locations in the image matrix (e.g., normalized, rectangular iris image). Collection of multiple iris images 212 from an individual establishes an ensemble of such a stochastic process. However, iris images of different individuals (as well as left and right eye iris images of the same individual) are considered to be independent biometrics. Accordingly, such iris (texture) images 212 represent realizations of different, independent and uncorrelated stochastic processes.

In embodiments of methods and systems disclosed herein, an iris texture intensity field may be modelled by a 2D stochastic spatial process. An iris image's intensity field may be a function of polar coordinates: radius and angle. Rows in a normalized iris image can correspond to circumferences in the original annular iris, each circumference having its own constant radius. Columns in the normalized iris image may represent points along radial directions of an annular iris image, each radial direction extending at its own constant angle. To extract a binary code sequence, a digital filter of the biometric encoder may slide and/or operate along a selected set of rows of the normalized iris image. In some embodiments, the width of the filter is less than the filter's height (while in some other embodiments, the opposite may be the case). Because it is determined that vertical intensity variations (along a column) are significantly smaller than the horizontal intensity variations (along a row), this observation justifies replacement or simplification of the 2D stochastic process (of the rectangular, normalized iris image) with one-dimensional (1D) processes each defined along a separate image row. (Rows and columns of a normalized iris image are defined above only by way of illustration, and may be swapped and processed accordingly without departing from the inventive concepts disclosed herein. For example, some embodiments of the system may convert an iris image into a single row or one-dimensional intensity profile 214, e.g., by unspooling/unwinding an annular iris image as a spiral.)

In some embodiments, an image processor of the system 202 may map or translate values or data corresponding to points or pixels along one iris image row, to a 1D spatial intensity profile 214. Certain component(s) of such an intensity profile 214, corresponding to an iris image row, can be modeled as a 1D stochastic process. The biometric encoder may divide or separate the process into non-stationary and stationary components. The non-stationary component 216 may be referred to as a trend of the intensity profile. The non-stationary component may comprise a part of the intensity profile that exhibits steady or gradual spatial changes, e.g., steady or gradual decreases and/or increases of its intensity values in space (e.g., along the corresponding row). Statistical properties (e.g., joint cumulative probability distribution function) and/or characteristics (e.g., moments such as mathematical expectation and variance) of a non-stationary process are not invariant (constant) when the process evolves or progresses in space or in time. For example, if a non-stationary process is partitioned into a few segments, then each segment may have different statistical characteristics (e.g., even though they correspond to the same normalized iris image row).

In some embodiments, the biometric encoder may determine the trend or non-stationary component 216 of an intensity profile (e.g., of an associated row) by, for example, operating or applying a moving average filter along the intensity profile, or fitting a smooth curve (e.g., n-degree algebraic or trigonometric polynomial curve) onto the (original or undisturbed) intensity profile. The biometric encoder may (detrend or) subtract the trend from the original intensity profile, to obtain a stationary component of the stochastic process (also referred as a detrended portion of the process). The stationary component may be modeled as a stochastic process. The stationary component may comprise a signal or profile that fluctuates or oscillates around zero intensity, and may be fast changing relative to the trend for instance. The detrended profile is a stationary stochastic component of the original iris texture intensity profile corresponding to a respective row. The detrended profile is referred to as a "stationary" stochastic component 218 in accordance with statistical stationarity, which refers to a time or spatial series whose statistical properties such as ean, variance, autocorrelation, etc., are constant over time or space. The stationarity here can refer to a weak or second order stationarity where two statistical characteristics of the stochastic process, namely, moments up to the second order (e.g., expectation and variance) do not depend on the time or a spatial variable (e.g., radial angle of an iris in this case).

Figure 2B:
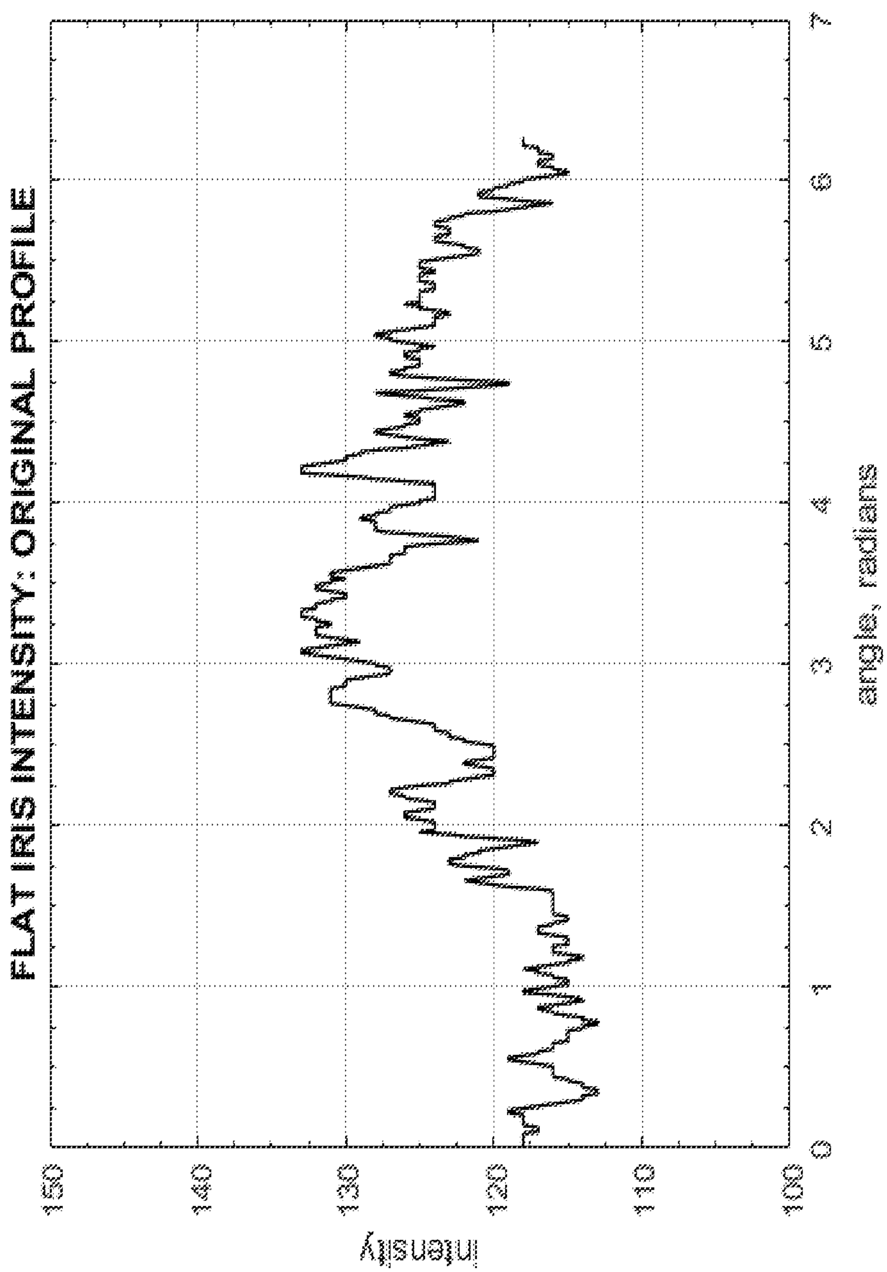
FIG. 2B depicts one embodiment of an intensity profile determined according to inventive concepts disclosed herein.
Figure 2C:
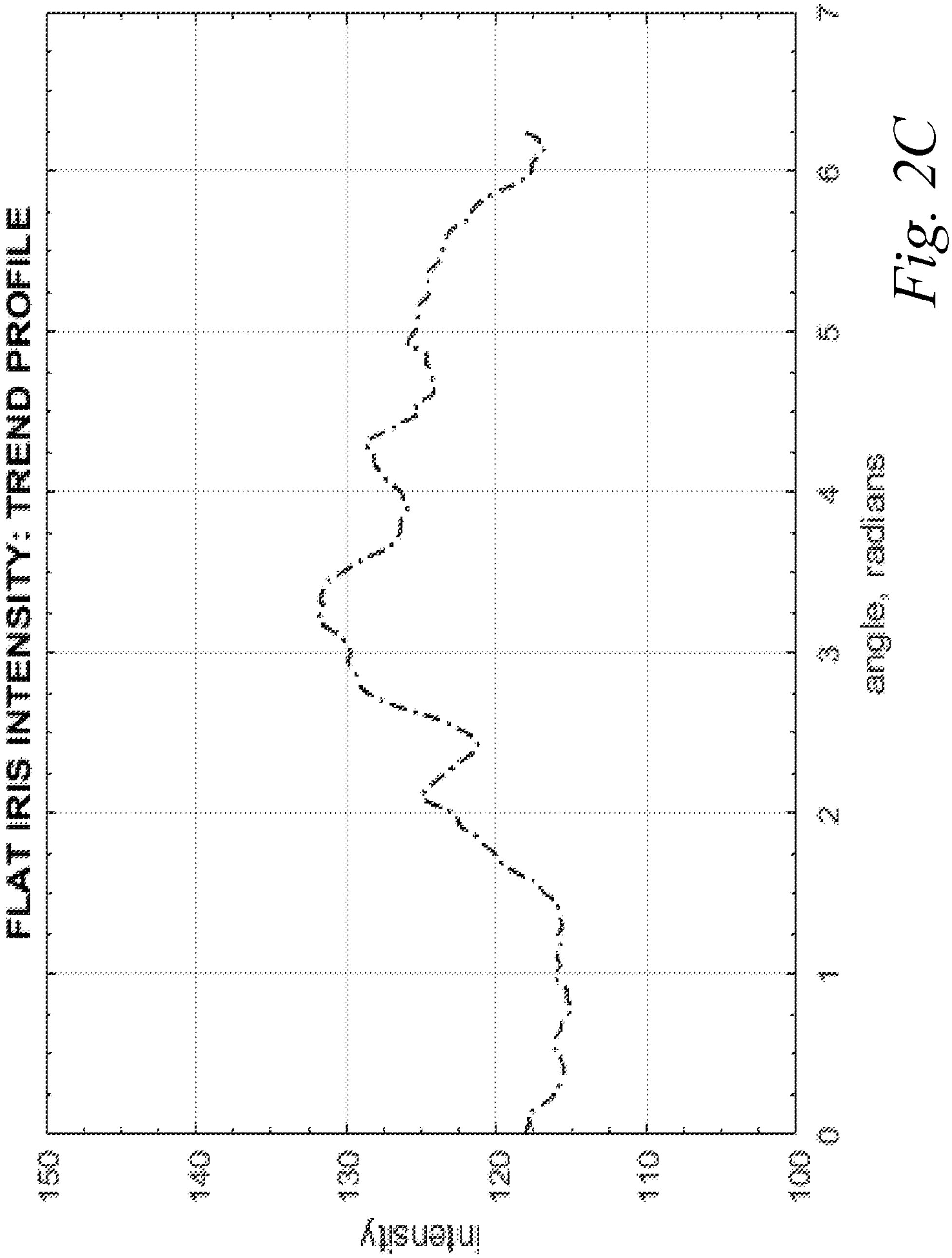
FIG. 2C depicts one embodiment of a non-stationary component of an intensity profile determined according to inventive concepts disclosed herein.
Figure 2D:
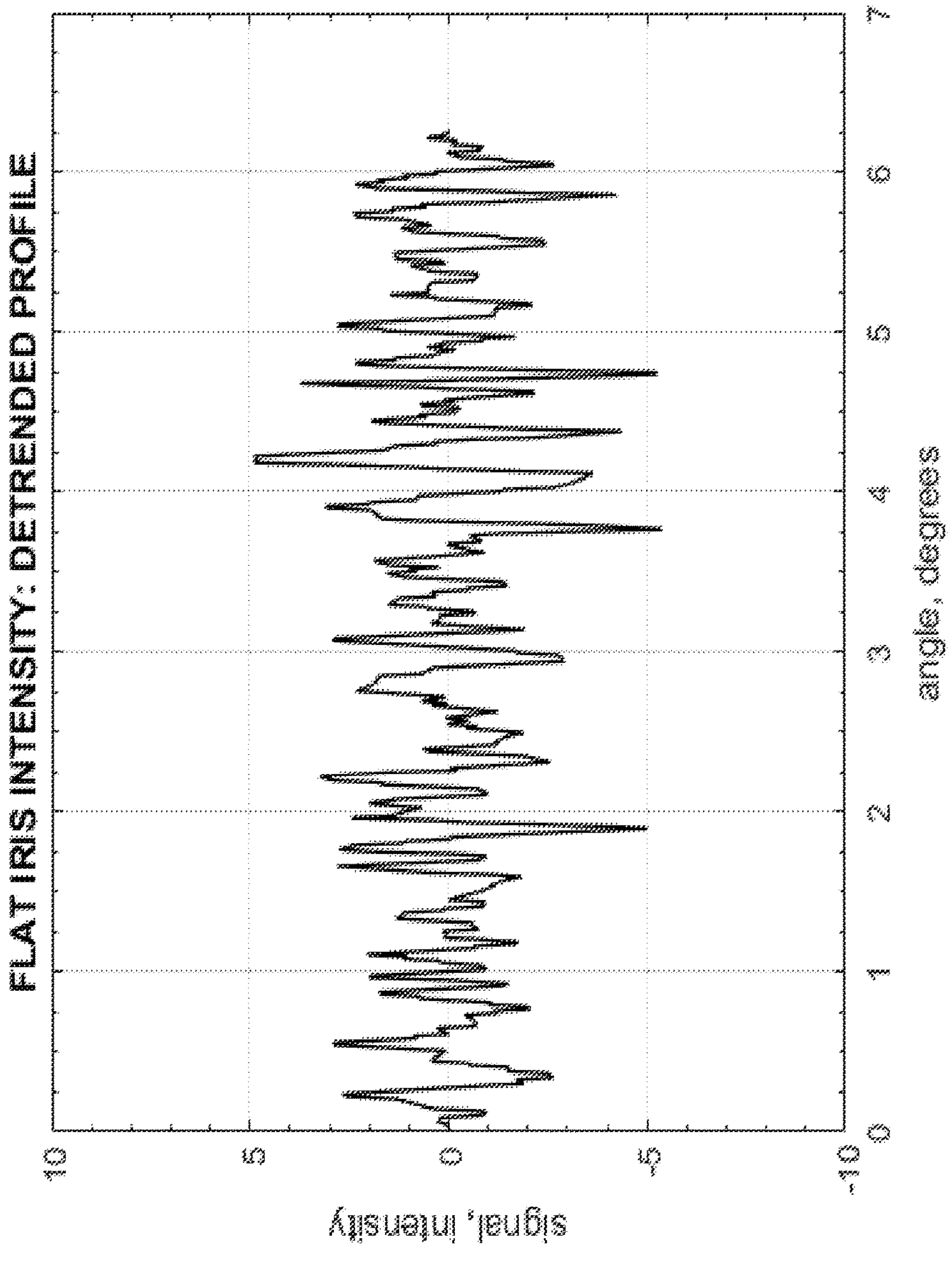
FIG. 2D depicts one embodiment of a stationary component of an intensity profile established according to inventive concepts disclosed herein.
Figure 2E:
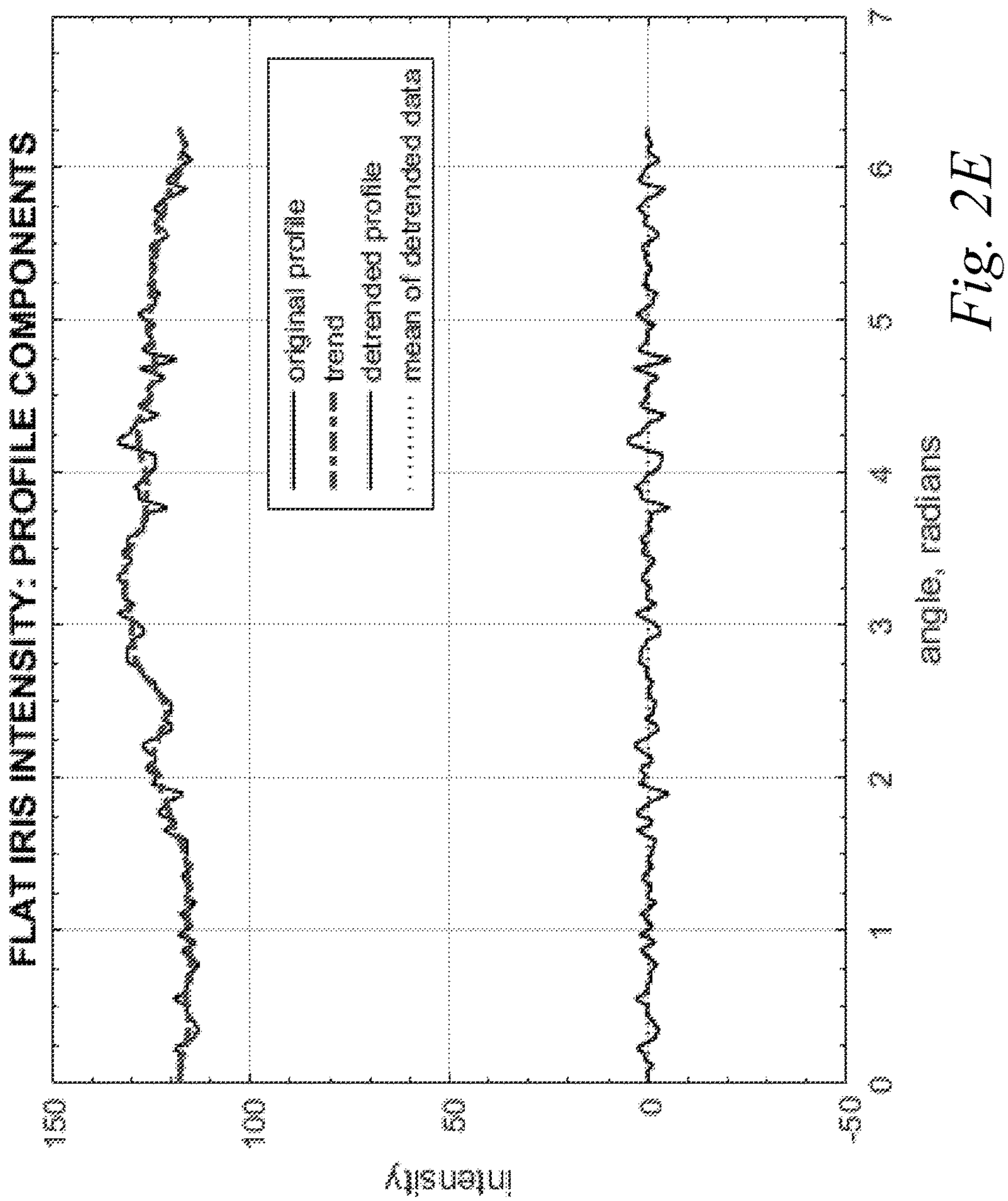
FIG. 2E depicts one embodiment of components of an intensity profile determined according to inventive concepts disclosed herein.

FIG. 2B depicts an example embodiment of a row intensity profile that includes stationary and non-stationary components. FIG. 2C depicts a corresponding trend obtained from the row intensity profile. FIG. 2D depicts a corresponding stationary component or detrended profile. FIG. 2E depicts various components of a row intensity profile, shown relative to the row intensity profile itself.

As determined and disclosed herein, the intensity profile components may have different physical origins. The trend 216 and the stationary stochastic component 218 may be driven by the NIR light that is reflected from the relatively large and fine iris texture structural details, respectively. It is also assumed here that the detrended signal (or stationary component 218) can be in general composed of two distinct components: one with discrete (harmonic or periodic component) and another one with continuous power spectra. The former comprises one or multiple periodic waveforms (e.g. sinusoids), and the latter can be a stochastic process (linear or non-linear) that can be referred as a background component 220 or noise; examples of the linear stochastic process that can be considered are a) autoregression (AR), b) moving average (MA) and c) their combination, also known as ARMA process.

The periodic waveforms can result from periodic structures of the iris texture and represent genuine iris texture features. A combination comprising trend (or non-stationary component), periodic waveforms (sinusoids), and/or stochastic components (e.g., a non-linear background signal) that are extracted from the normalized iris intensity profile rows can create a complex (e.g., complex signal/profile) from which an iris profile component or a combination of the components can be selected to create a unique authenticating signature for the corresponding iris/individual.

Performance of the encoded iris intensity component or combination of the components can be measured by two main characteristics: False Acceptance Rate (FAR) and False Rejection Rate (FRR). These characteristics are obtained conducting so called authentic and impostor iris image comparisons or matches. Authentic comparisons are matches between iris images belonging to the same subject only. Left and right irises of the same individual are considered as different subjects. Impostor comparisons are matches between iris images belonging to the different subjects only. Match between a pair of iris images is qualified as a successful one if a matching score that is computed from two iris code sequences is above a predefined matching threshold, otherwise the match is rejected (or considered non-matching). The FAR (or false positive) is a fraction (or count) of impostor iris image pairs which were successfully matched together. Correspondingly, the FRR (or false negative) is a fraction (or count) of authentic iris image pairs which have been rejected. Values of FAR and FRR computed using multiple matching thresholds can form a so-called Detection Error Tradeoff Curve (DET curve).

The DET curve is a graph of the dependency of FRR vs. FAR. Performance comparison of two different biometric systems or performances of the same system but for different conditions are conducted by computing their DET curves: a system (or a system's configuration) is recognized as more accurate than a competitor (or another candidate) if its DET curve is located lower (e.g., with respect to FRR, such as with FRR on a y-axis and FAR on an x-axis for the DET curve). In the case when two DET curves intersect, biometric accuracy is different on either side of the intersection (e.g., before and after the intersection). This is because a first curve could be the lower curve on one side of the intersection (and be the more accurate system in comparison), but that the first cure would be the higher curve on the other side of the intersection (and be the less accurate system in comparison). Recognition accuracy (FAR, FRR) can be estimated at any point on the curve but there are no quantitative criteria allowing comparison of the biometric performance over the entire range.

The following methodology aims to offer a quantitative measure for performance of the biometric system 202 (FIG. 2A) over the entire range of its DET curve. Notion of the iris signal is introduced as the following. It is an intensity profile 214 (FIG. 2A) or any of its components, for example, 216, 218 or 220 that can be extracted from or computed based on a normalized iris texture image. If an iris signal is used as a biometric, its efficiency for iris recognition can be assessed by matching process via DET curve. As it was mentioned before, DET points are obtained from authentic and impostor matches by calculating FAR($\tau$) vs. FRR($\tau$) values using multiple thresholds $\tau$ set for comparing against matching scores determined from specified pairs of biometric templates. Then we select a working or operating range for FAR, for example, FAR$\epsilon[10^{-7},10^{-2}]$. Values of FAR and FRR corresponding to the working range are plotted on a log-log plot. Using log-scale on both axes helps to reveal an underlying functional relationship between FRR and FAR. If a straight-line segment can be fit well to the DET points which is often the case, then there are power law relationships between FAR and FRR: $y=ax^b$, where y and stand for FRR and FAR, respectively; and a, b are constants determined during the straight-line segment fitting procedure, according to the DET points.

Rectangle $x \in [x_{min}, x_{max}]$ and $y \in [s,1]$, $(s<0)$ contains all DET segments that can be calculated for various biometric systems and/or various signals/parameters for the same system within the given operating range. This rectangle can be called a performance rectangle. Excellent biometric corresponds to a horizontal segment with $y=s>0$, and $\varepsilon$ being a very small number. Then closer a DET line segment is to the boundary $y=1$, then the poorer the quality of the type of biometrics (signals) offered under that system for matching. A segment which coincides with the upper boundary of the performance rectangle is effectively a biometric noise: such a system or a signal would not have the ability to distinguish irises of different individuals (since FRR is 1 or 100%). Authentic and impostor histograms for such a system (signal) would be completely overlapping.

Ratio of the performance rectangle area to the area under a DET line-segment may serve as a performance measure for a biometric system or signal in given operational range. This ratio can be called Biometric-Signal-To-Noise-Ratio (BSNR). The BSNR values are always greater or equal to 1. The larger the BSNR values, the better the biometric properties of an iris signal or a biometric system are. BSNR values close to or equal to 1 corresponds to a biometric noise. The concept of the BSNR can be applied to any one or a combination of the stationary, non-stationary and periodic components of the normalized iris texture profiles, as well as to the iris profiles themselves to assess their biometric properties or quality. The biometric encoder 222 may identify or find the iris profile periodicities that are hidden in a stationary component using for instance a method that utilizes a few discrete prolate spherical sequences as data multi-tapers. Periodic component(s) may be computed from a linear regression between two discrete Fourier transforms: tapered intensity profile and the tapers themselves. A few discrete prolate spherical sequences constitute a linear regression, and the amplitude of a complex-valued sinusoid is the model's coefficient. Sinusoid amplitude may be computed using the Fast Fourier Transform and complex-valued least square regression for each Fourier frequency of a grid. Significant periodic components may be selected according to the F-test for the statistical significance of a regression coefficient. If the F-test is significant at a certain frequency, then the sinusoid parameters (e.g., amplitude and phase) may be computed from the complex sinusoid at this frequency. The biometric encoder may subtract the identified periodic components from the row stochastic stationary component to separate them from the background. Whatever has left from the stationary component after the subtraction may be referred as the background 220.

In certain embodiments, the biometric encoder may apply special tests to determine whether the background 220 is colored or white Gaussian noise. In these cases, one or more important background characteristics may be found, e.g., a) noise amplitude (background standard deviation), and b) width of the autocorrelation function of the process. If the background comprises white Gaussian noise, the standard deviation may be obtained as a process parameter (e.g., the only process parameter in some embodiments). If the background comprises color Gaussian noise, it may be modelled as an auto-regressive (AR), moving average (MA), or auto-regressive moving average (ARMA) process, where standard deviation may be obtained as one of the process parameters.

Noise modeling, such as using AR/MA/ARMA models, may be used to extract and/or remove a linear AR/MA/ARMA based background component (or image noise) from the background 220. A signal that is left because of the AR/MA/ARMA modeling to remove image noise can represent a residual non-linear stochastic process. The latter can be referred to as a non-linear stochastic background signal or a non-linear background. In some embodiments, such modeling to remove noise is preferred over threshold-based removal of noise. For instance, noise-removal via modeling can allow much or all of the non-linear background signal to be retained rather than be lost or compromised. It may be desirable to retain and/or use the non-linear background signal for biometric matching purposes. The non-linear background signal (e.g., contained within the signal shown in FIG. 2D, and within the signal components shown in the bottom portion of FIG. 2E) has the potential to provide biometric characteristics useful for biometric matching, as discussed further below. For instance, when the non-linear background signal is (e.g., isolated) and combined with the non-stationary component, the resultant biometric signal can show good performance for biometric matching.

In some embodiments, white background (Gaussian noise) represents ultimate noise (e.g., independent and uncorrelated random fluctuations of the pixel values) that is left over after the modeling. The background that is qualified as white noise can negatively affect the accuracy of the encoding. Unlike white noise, colored stationary noise has a non-trivial autocorrelation function. The function's width defines a characteristic scale (length in space) within which pixel correlation between pixels is considered significant. Thus, pixels that are separated by distances exceeding the correlation scale are considered uncorrelated. An average width of the background autocorrelation function may be found by processing multiple iris images. For instance, a plurality of iris image backgrounds are modeled from flat iris rows corresponding to a plurality of iris images, and then the background characteristics, width being one of them, may be averaged across many images. As such, an average width value can be obtained and applied in the encoding for all irises. It is therefore not necessary for width determinations to be performed every time an iris image is acquired.

These characteristics and the earlier process parameters 226 can describe different aspects of the iris texture. Thus, periodic structures and colored background characteristics can yield information that can help or improve the iris texture encoding process. For example, one may encode stochastic (detrended profiles) components from several flat iris rows. The signals (periodic components) are run through the filter 224, whose parameter(s) 226 (e.g., size or scale) and noise thresholds may be set using background characteristics, e.g., width of a corresponding autocorrelation function and standard deviation, respectively. These characteristics may be determined over multiple iris images.

The BSNR criteria is used to evaluate biometric properties of the periodic and colored background (modelled as a linear stochastic process) components when they are encoded using the filter 224 with the preset four scale parameters 226 determined without estimating width of a corresponding autocorrelation function. According to BSNR values calculated for these components, their biometric capabilities are zero or close to zero. In fact, biometric performance of an iris signal can be substantially improved when periodic components and/or linearly modelled (e.g., linear AR/MA/ARMA, or noise) background components are detected and removed from the iris intensity profile. In some instances, when the residual non-linear background component is for example isolated and added to the trend, the resulting signal's performance measured using BSNR can exceed the biometric performance of the original iris signal. The above can be observed in FIG. 2G, which includes a graphical representation of DET line segments corresponding to various iris image components.

In some embodiments, the periodic components do not have to be filtered as part of the encoding process to create an iris binary signature for authenticating purposes. These periodic components can be encoded directly without running through filter 224.

Accordingly, by establishing a statistical model according to certain embodiments of the present systems and methods, such a statistical model can facilitate an improvement or optimization of the iris encoding process. First, by analyzing filter responses from the background at a set of different size values, we can directly measure noise levels corresponding to each size. Therefore, by averaging and/or comparing the values over the ensembles, we can determine values for noise vs. signal thresholds for each filter size. Such a threshold is sometimes referred as texture noise threshold, which may be used to set iris code bits. If a filter response at a given filter size exceeds the texture noise threshold, the bit may be set to ONE, otherwise can be set to ZERO for instance. Second, width of the autocorrelation function defines a distance how far point intensities influence value at a given point. The width can be used as a basic parameter for setting the filter's size.

In summary, according to some embodiments of the present systems and methods, introducing a stochastic model for iris texture intensity can allow us to create a statistical model for row intensity profiles in a normalized iris representation. The model may include at least three components: trend 216, stationary periodic or harmonic process (sum of sinusoid waveforms) 218, and background (e.g., white or colored Gaussian noise) 220. The trend 216 may be a slow changing non-stationary component which may be controlled by long scale iris texture structures as well as being attributed to magnitude of ambient light and/or iris illumination and/or camera gain. The stationary periodic component can include a sum of sine waveforms, and their characteristics (e.g., amplitude, phase and frequency) may be estimated from the row intensity profiles. Biometric properties of these characteristics can be evaluated using the BSNR criteria. The background contributes or comprises noise added into the acquired iris images and can describe correlations between texture pixels.

Figure 2F:
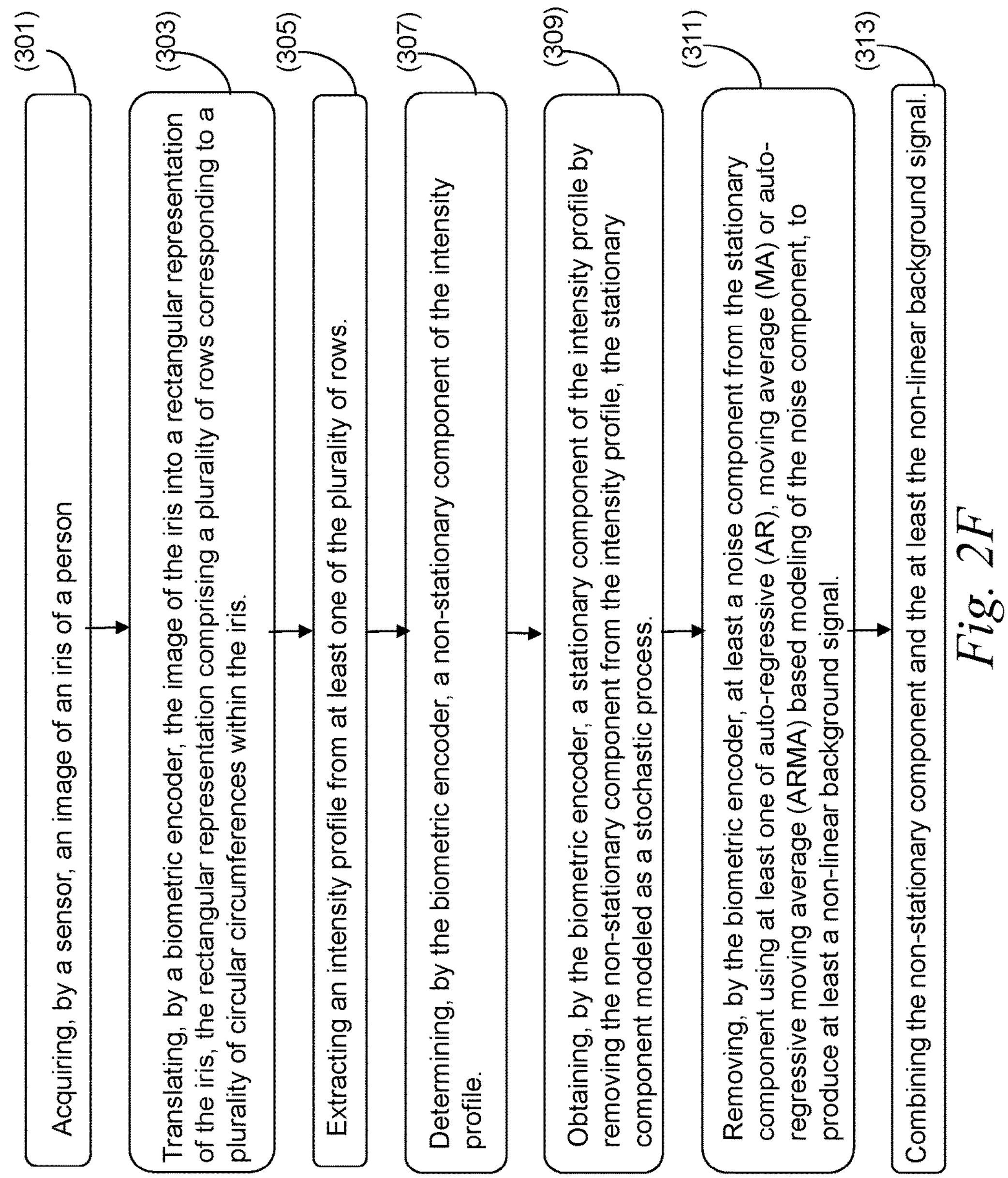
FIG. 2F is a flow diagram depicting one embodiment of a method of using iris data for authentication.
Figure 2G:
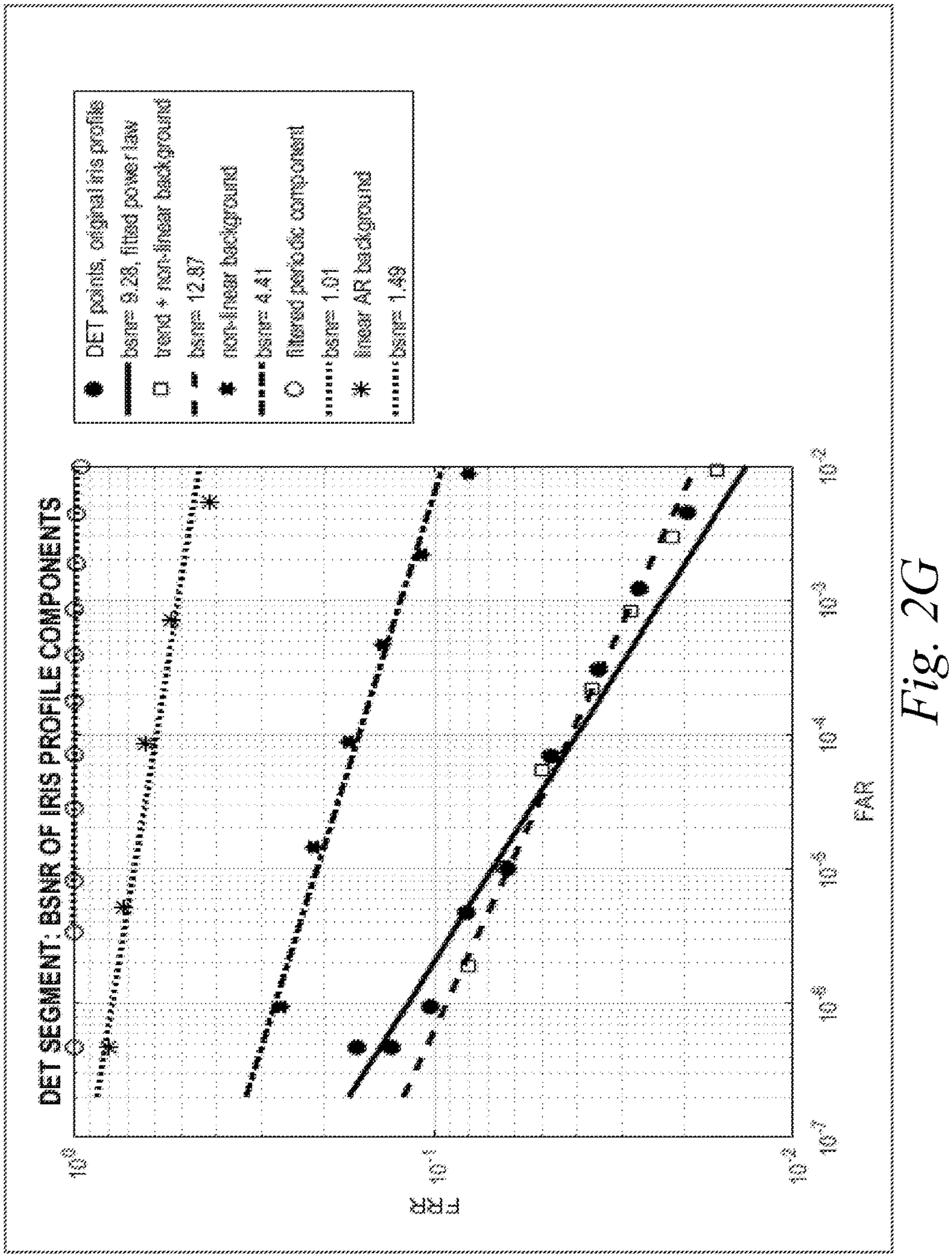
FIG. 2G depicts one illustrative form of a graphical plot of example embodiments of detection error tradeoff line segments corresponding to various iris image components.

Referring now to FIG. 2F, one embodiment of a method using iris data for authentication is depicted. The method may include acquiring, by a sensor, an image of an iris of a person (301). A biometric encoder may translate the image of the iris into a rectangular representation of the iris (303). The rectangular representation may include a plurality of rows corresponding to a plurality of circular circumferences within the iris. The biometric encoder may extract an intensity profile from at least one of the plurality of rows (305). The biometric encoder may determine a non-stationary component of the intensity profile (307). The biometric encoder may obtain a stationary component of the intensity profile by removing the non-stationary stochastic component from the intensity profile, the stationary component modeled as a stochastic process (309). The biometric encoder may remove at least a noise component from the stationary component using at least one of auto-regressive (AR), moving average (MA) or auto-regressive moving average (ARMA) based modeling of the noise component, to produce at least a non-linear background signal (311). The biometric encoder may combine the non-stationary component and the at least the non-linear background signal, to produce a biometric template for authenticating the person (313).

Referring now to (301), and in some embodiments, a sensor may acquire an image of an iris of a person. The sensor may be configured to acquire iris biometrics or data, s in the form of one or more iris images 212. The system may include one or more illumination sources to provide light (infra-red, NIR, or otherwise) for illuminating an iris for image acquisition. The sensor may comprise one or more sensor elements, and may be coupled with one or more filters (e.g., an IR-pass filter) to facilitate image acquisition. The sensor 221 may be configured to focus on an iris and capture an iris image of suitable quality for performing iris recognition.

In some embodiments, the sensor may operate with an image processor to locate and/or zoom in on an iris of an individual for image acquisition. In certain embodiments, an image processor may receive an iris image 212 from the sensor 211, and may perform one or more processing steps on the iris image 212. For instance, the image processor may identify a region (e.g., an annular region) on the iris image 212 occupied by the iris. The image processor may identify an outer edge or boundary, and/or an inner edge or boundary of the iris on the iris image, using any type of technique (e.g., edge and/or intensity detection, Hough transform, etc.). The image processor may segment the iris portion according to the inner (pupil) and outer (limbus) boundaries of the iris on an acquired image. In some embodiments, the image processor may detect and/or exclude some or all non-iris objects, such as eyelids, eyelashes and specular reflections that, if present, can occlude some portion of iris texture. The image processor may isolate and/or extract the iris portion from the iris image 212 for further processing. The image processor may extract and/or provide a segmented iris annulus region for further processing.

Referring to (303) and in some embodiments, a biometric encoder may translate the image of the iris into a rectangular representation of the iris. The rectangular representation may include a plurality of rows corresponding to a plurality of annular portions of the iris. The biometric encoder 222 and/or the image processor may translate, map, transform and/or unwrap a segmented iris annulus into a rectangular representation, e.g., using a homogeneous rubber-sheet model and/or dimensionless polar coordinates (radius and angle) with respect to a corresponding center (e.g., a corresponding pupil's center). In some embodiments, the size of the rectangle and partitioning of the polar coordinate system are predetermined or fixed. This procedure can compensate for pupil dilations and/or constrictions.

The biometric encoder 222 and/or the image processor may map or translate the iris portion of the iris image 212 from Cartesian coordinates to a polar rectangle or rectangular form of the iris data, which is sometimes referred to as a normal or normalized iris image or representation. Rows in a normalized iris image can correspond to circumferences in the original annular iris, each circumference having its own constant radius. Columns in the normalized iris image may represent points along radial directions of an annular iris image, each radial direction extending at its own constant angle Referring to (305) and in some embodiments, the biometric encoder may extract an intensity profile from at least one of the plurality of rows of the rectangular representation, the intensity profile modeled as a stochastic process. The intensity profile may be modeled as a one-dimensional stochastic process (e.g., corresponding to a row of the rectangular representation) with the stationary and non-stationary stochastic components. The biometric encoder may divide or separate the process into non-stationary and stationary components.

Referring to (307) and in some embodiments, the biometric encoder may determine a non-stationary stochastic component of the intensity profile. The non-stationary component 216 may be referred to as a trend of the stochastic process. The non-stationary component may comprise a part of the intensity profile that exhibits steady or gradual spatial changes, e.g., steady or gradual decreases and/or increases in space (e.g., along the corresponding row).

In some embodiments, the biometric encoder may determine the trend or non-stationary component 216 of an intensity profile (e.g., of an associated row) by, for example, operating or applying a moving average filter along the intensity profile, or fitting a smooth curve (e.g., n-degree polynomial curve) onto the (original) intensity profile.

Referring to (309) and in some embodiments, the biometric encoder may obtain a stationary stochastic component of the intensity profile by removing the non-stationary stochastic component from the intensity profile. The stationary stochastic component may comprise a signal that fluctuates or oscillates around zero intensity. The biometric encoder may "detrend" or subtract the trend from the original intensity profile, to obtain a stationary component of the stochastic process (also referred as a detrended portion of the process). The stationary component may comprise a signal or profile that fluctuates or oscillates around zero intensity, and may be fast changing relative to the trend for instance. The detrended profile may comprise a stationary stochastic component of the original iris texture intensity profile corresponding to a respective row.

Referring to (311) and in some embodiments, the biometric encode removes at least a noise component from the stationary component using at least one of auto-regressive (AR), moving average (MA) or auto-regressive moving average (ARMA) based modeling of the noise component, to produce at least a non-linear background signal. The stationary component may include a background component 220 and a periodic component 229. In certain embodiments, the biometric encoder may apply one or more tests to determine whether the background 220 is colored or white Gaussian noise. In these cases, one or more important background characteristics may be found, e.g., a) noise amplitude (background standard deviation), and b) width of the autocorrelation function of the process, which may be used to determine whether the background 220 includes colored or white Gaussian noise for instance. If the background is determined to include color Gaussian noise, the noise may be modelled as an auto-regressive (AR), moving average (MA) or auto-regressive moving average (ARMA) process, where standard deviation may be obtained as one of the process parameters.

In some embodiments, the biometric encoder may use noise modeling, such as using AR/MA/ARMA models, to extract and/or remove a linear AR/MA/ARMA background signal (or image noise component) from the background 220 (in the stationary component). A signal that is left because of the AR/MA/ARMA modeling to remove the image noise component (from the background component 220) can represent a residual non-linear stochastic process (of the background component 22). The latter can be referred to as a non-linear stochastic background signal or non-linear background signal. In some embodiments, such modeling to remove noise is preferred over threshold-based removal of noise. For instance, noise-removal via modeling can allow much or all of the non-linear background signal to be retained rather than be lost or compromised. It may be desirable to retain and/or use the non-linear background signal for biometric matching purposes.

In some embodiments, the biometric encoder may identify one or more periodic waveforms in the stationary stochastic component, for example to exclude or use for authenticating the person. The one or more periodic waveforms is sometimes referred to as the periodic component 229. For instance, the biometric encoder may in certain embodiments remove the at least a noise component from the stationary component as well as remove the identified one or more periodic waveforms from the stationary component, to produce at least the non-linear background signal.

In other embodiments, the biometric encoder may remove the at least a noise component from the stationary component, and retain or include the identified one or more periodic waveforms (periodic component 229), to produce a processed signal that includes the non-linear background signal and the periodic component (which can also be referred to as "at least the non-linear background signal"). Thus, the biometric encoder 222 can generate an iris code or biometric template using the identified one or more periodic waveforms (e.g., in the at least the non-linear background signal). An iris code may be in any form, and may for example comprise a binary sequence of a constant length (e.g., equal to 2048 bits).

The biometric encoder may identify the one or more periodic waveforms in the stationary stochastic component via certain methods. For instance, the biometric encoder 222 may identify or find periodicities in the stationary component using for instance a method that utilizes a few discrete prolate spherical sequences as data multi tapers. Sinusoid parameters may be computed using Fast Fourier Transform and complex-valued least square regression for each Fourier grid frequency. Significant periodic components may be selected according to a F-test on statistical significance. The biometric encoder may subtract the identified or selected periodic waveforms from the row stochastic stationary component.

Referring to (313) and in some embodiments, the biometric encoder may combine the non-stationary component and the at least the non-linear background signal, to produce a biometric template for authenticating the person. The non-linear background signal may provide biometric characteristics useful for biometric matching. For instance, when the non-linear background signal is isolated and combined with the non-stationary component, the resultant biometric signal can provide good performance for biometric matching. Accordingly, the biometric template may be generated to include the non-linear background signal and the non-stationary component, and may further include the periodic component in some cases. The various components may be combined, added or superimposed together as signal components, to form a processed intensity profile. An iris code or biometric template can be generated from the processed intensity profile using the biometric encoder. In some cases, the iris code or biometric template is transmitted and/or stored for use in biometric recognition.

In some embodiments, a biometric engine may compare an iris code or biometric template, with stored or collected data to authenticate the person. The biometric template produced may be unique to the person or iris. In certain embodiments, the database 250 may store the iris code or biometric template, or other representation of the identified one or more periodic waveforms for authenticating the person. A biometric engine 221 may perform biometric matching or verification. For instance, the matching process may include calculating a number of bit disagreements and/or bit matches between valid bits of an obtained/collected iris code/representation and a stored biometric template (e.g., Hamming distance). The matching between the iris code/representation and the biometric template is considered successful if the Hamming distance value is below a predefined threshold for example (e.g., the probability of a match is less than a predetermined threshold). Otherwise the matching may be rejected as unsuccessful.

In some embodiments, a biometric encoder may remove the identified one or more periodic waveforms from the stationary stochastic component to produce a background component corresponding to each of the at least one of the plurality of rows. In certain embodiments, the biometric encoder may apply special tests to determine whether the background is colored or white Gaussian noise, and determine corresponding parameters. The biometric encoder may determine a width of an autocorrelation function of the background component, e.g., by evaluating multiple iris images. The biometric encoder may set a filter scale of a first filter according to the determined width, for filtering or processing periodic waveforms identified from another iris image. The biometric encoder may determine a texture noise threshold using the background component. For instance, filter responses with magnitude below the $20^{th}$ percentile may be considered to be due to noise. Histograms and therefore thresholds can be created for several filter scale values. A filter scale may be defined as a length (e.g. in pixels) of a spatial segment that is used to calculate a digital filter's response at a given pixel.

In some embodiments, the Biometric-Signal-To-Noise-Ratio (BSNR) criteria may be calculated based on the fitted segment of the Detection Error Tradeoff curve to quantitatively evaluate recognition performance of a biometric system or biometric properties of an iris signal. The BSNR criteria may be also used as a quantitative measure to compare performance of a few biometric systems and/or iris signals.

In summary, according to some embodiments of the present systems and methods, introducing a stochastic model for iris texture intensity can allow us to create a statistical model for row intensity profiles in a normalized iris representation. The model may include at least three components: trend 216, a stationary component 218 which includes a periodic or harmonic process (sum of sinusoid waveforms) 229 and a background component (e.g., white or colored Gaussian noise) 220. The trend 216 may be a slow changing non-stationary component which may be mainly controlled by or attributed to magnitude of iris illumination and/or camera gain. The periodic component can include a sum of sine waveforms, and their characteristics (e.g., amplitude and frequency) may be estimated from the row intensity profiles. These characteristics can describe unique biometric details of the iris texture. The background component can contribute or comprise noise added into the acquired iris images, and can describe parameters useful for iris encoding, which may be obtained from correlations between texture pixels for example, i.e. "memory" distance. The background component can also include a linear stochastic background component.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A method of using iris data for authentication, comprising:

translating, by a biometric encoder, an image of the iris acquired by a sensor into a rectangular representation of the iris, the rectangular representation comprising a plurality of rows corresponding to a plurality of circular circumferences within the iris;

extracting an intensity profile from at least one of the plurality of rows;

determining, by the biometric encoder, a non-stationary component of the intensity profile;

obtaining, by the biometric encoder, a stationary component of the intensity profile by removing the non-stationary component from the intensity profile, the stationary component modeled as a stochastic process;

removing, by the biometric encoder, at least a noise component from the stationary component using at least one of auto-regressive (AR), moving average (MA) or auto-regressive moving average (ARMA) based modeling of the noise component, to produce at least a non-linear background signal; and combining the non-stationary component and the at least the non-linear background signal, to produce a biometric template for authenticating the person.

2. The method of claim 1, further comprising identifying one or more periodic waveforms in the stationary component.

3. The method of claim 2, wherein removing the at least a noise component from the stationary component further comprises removing the identified one or more periodic waveforms from the stationary stochastic component to produce the at least the non-linear background signal.

4. The method of claim 2, further comprising removing the identified one or more periodic waveforms from the stationary stochastic component to produce a background component, and determining a width of an autocorrelation function of the background component.

5. The method of claim 4, further comprising setting a filter size of a first filter according to the determined width, for filtering or processing periodic waveforms identified from another iris image.

6. The method of claim 1, further comprising determining that a combination of the non-stationary component and the at least the non-linear background signal would produce a biometric template with better iris recognition performance than a biometric template produced using another combination or using only one of the non-stationary component or the non-linear background signal, according to a comparison of corresponding values of biometric signal to noise ratio (BSNR).

7. The method of claim 2, further comprising storing a representation of the identified one or more periodic waveforms for authenticating the person.

8. The method of claim 1, further comprising comparing the biometric template with stored or acquired data to authenticate the person.

9. The method of claim 1, wherein the stationary stochastic component comprises a signal that fluctuates around zero intensity.

10. The method of claim 1, wherein the intensity profile is modeled as a one-dimensional stochastic process with the stationary and non-stationary stochastic components.

11. A system of using iris data for authentication, comprising:

a sensor configured to acquire an image of an iris of a person; and a biometric encoder configured to:

translate the image of the iris into a rectangular representation of the iris, the rectangular representation comprising a plurality of rows corresponding to a plurality of circular circumferences within the iris;

extracting an intensity profile from at least one of the plurality of rows;

determine a non-stationary component of the intensity profile;

obtain a stationary component of the intensity profile by removing the non-stationary stochastic component from the intensity profile, the stationary component modeled as a stochastic process;

remove at least a noise component from the stationary component using at least one of auto-regressive (AR), moving average (MA) or auto-regressive moving average (ARMA) based modeling of the noise component, to produce at least a non-linear background signal; and combine the non-stationary component and the at least the non-linear background signal, to produce a biometric template for authenticating the person.

12. The system of claim 11, wherein the biometric encoder is further configured to identify one or more periodic waveforms in the stationary component.

13. The system of claim 12, wherein the biometric encoder is further configured to remove the identified one or more periodic waveforms from the stationary stochastic component to produce the at least the non-linear background signal.

14. The system of claim 13, wherein the biometric encoder is further configured to remove the identified one or more periodic waveforms from the stationary stochastic component to produce a background component, and determine a width of an autocorrelation function of the background component.

15. The system of claim 14, wherein the biometric encoder is further configured to set a filter size of a first filter according to the determined width, for filtering or processing periodic waveforms identified from another iris image.

16. The system of claim 14, wherein the biometric encoder is further configured to determine a texture noise threshold using the background component.

17. The system of claim 12, wherein the biometric encoder is further configured to store a representation of the identified one or more periodic waveforms for authenticating the person.

18. The system of claim 11, further comprising a processor configured to compare the biometric template with stored or acquired data to authenticate the person.

19. The system of claim 11, wherein the stationary stochastic component comprises a signal that fluctuates around zero intensity.

20. The system of claim 11, wherein the intensity profile is modeled as a one-dimensional stochastic process with the stationary and non-stationary stochastic components.

* * * * *